United States Patent
Buttweiler et al.

[11] 3,648,056
[45] Mar. 7, 1972

[54] OPTICAL DETECTOR WITH RADIANT ENERGY ABSORBING CHAMBER

[72] Inventors: Thomas B. Buttweiler, Albertville; Joseph S. Titus, Minnetonka, both of Minn.

[73] Assignee: Honeywell Inc., Minneapolis, Minn.

[22] Filed: Jan. 12, 1970

[21] Appl. No.: 2,138

[52] U.S. Cl. .................................. 250/239, 250/238, 250/228
[51] Int. Cl. ........................................................... H01j 15/00
[58] Field of Search .................... 250/228, 238, 216, 219 DC, 250/227, 239; 356/236, 234, 4; 350/276 SU, 205, 206

[56] References Cited

UNITED STATES PATENTS

| | | |
|---|---|---|
| 773,202 | 10/1904 | Ewing ....................................... 350/205 |
| 2,164,526 | 7/1939 | Kimmich ................................. 350/206 |
| 2,995,997 | 8/1961 | Nieuwenhoven ....................... 350/206 |
| 3,023,318 | 2/1962 | Jones ................................. 250/239 X |
| 3,497,694 | 2/1970 | Jura et al. ......................... 250/227 X |
| 3,500,049 | 3/1970 | Nutz ................................. 250/237 X |

Primary Examiner—Walter Stolwein
Attorney—Charles J. Ungemach and Ronald T. Reiling

[57] ABSTRACT

Apparatus for protecting an electro-optical detector from sources of radiant energy located off the primary optical axis is provided so as to take advantage of the focusing characteristics of the primary optical components to direct desired radiation in a cavity designed and located to receive the focused off-axis radiant energy and cause it to dissipate by absorption during a number of reflections.

4 Claims, 4 Drawing Figures

OPTICAL DETECTOR WITH RADIANT ENERGY ABSORBING CHAMBER

BACKGROUND

This invention relates to a field of optical apparatus and more particularly to apparatus for protecting an electro-optical detector from sources of radiant energy located off the primary optical axis.

Electro-optical detectors are generally operated in conjunction with primary optical systems for gathering and focusing the "target" radiation from a desired source, toward which the optical axis of the system is accordingly directed. It is essential to the operation of such devices that interference from off-axis radiation be restricted. This stray radiant energy is a result of self-emission of the instrument structure, as well as radiation from distant nontarget sources, and poses a critical problem in connection with numerous devices, such as electro-optical trackers, radiometers, coronagraphs, and spectro-photometers. A particularly acute need for stray radiation shielding is experienced in connection with electro-optical radiometer systems such as are used to determine the radiant intensity of specific sources. Successful operation of the radiometer system is dependent upon the "source" signal reception being maintained at a detectable level relative to the limiting system noise. Since the intensity of the target source is generally low, interference from even a weak source off the target axis can cause the system to generate erroneous signals.

A common means for restricting stray radiation involves the placing of a cylindrical tube in front of the primary optical system so as to restrict the view factor of the entrance aperture. The interior of the tube is typically coated with a radiation-absorbing material, and means are often provided for cooling the device to reduce the effects of self-emission. This technique has a serious drawback, however, in that to be very effective the ratio of the length of the cylinder to its diameter must be relatively large. This can severely limit the use of such a device, for example, on airborne or space vehicles. Improvements have been made on the cylindrical shield by placing in the cylinder one or more relatively thin plates or baffles with knife-edged apertures in their centers to form a "tube-baffle shield." Again, the theory of operation of these baffles is simply to shield the optics from off-axis radiation by reducing the view factor of the primary optics.

Even the best of the prior-art shielding devices are severely limited in their ability to attenuate stray radiation. Their limitations center around the fact that in most cases the effects of self-emission and internal reflections have gone uncorrected. Current attempts to improve the devices have generally been concentrated on structuring the internal surface of cylindrical-type shields. These, however, have met with limited success. For example, in the "tube-baffle shield" the number of baffles can be increased to increase shielding, but the number is limited by space, and as the number is increased, so is the area which can produce undesirable internal reradiation and reflection of off-axis energy. Furthermore, a practical limit exists, for after certain point very little increase in attenuation results from the addition of more knife-edge baffles.

BRIEF SUMMARY OF THE INVENTION

The present invention utilizes an approach to reducing the effects of stray radiation which differs in basic theory from that of prior-art devices, and is more compact and efficient than these devices. Rather than placing a baffle in front of the optics, the applicant places a unique optical shield between the primary optical apparatus and the electro-optical detector, and thus operates in the image plane of the optical system. Its preferred embodiment is that of a main chamber in the shape of a truncated cone with a wall in each end. The front end wall has an aperture in its center of sufficient diameter that focused light from the primary optical apparatus can enter the chamber. The rear end wall comprises a relatively thin conical surface located so that its apex projects into the main chamber. A small aperture is located in place of the apex of the cone, connecting the main chamber to a conical interior and open base of the cone. The applicant utilizes the imaging characteristics of the primary optics to focus the target radiation through the small aperture, leaving the focused off-axis radiation directed to a cavity formed between the main chamber walls and the conical rear end wall. The cavity and chamber are carefully designed so as to cause the off-axis radiation to experience a large number of reflections before it has a chance to escape to affect the detector. The walls of the entire chamber are coated with a material capable of absorbing a large portion of the radiation incident upon it, so that after a few reflections a significant amount of stray radiation is absorbed. Means are provided for cooling the chamber to ultimately remove accumulated energy and reduce any self-emission.

A number of cavity configurations are conceivable which would effectively trap the focused off-axis radiation, so it is not necessary that the optical shield comprise the combination described above. For example, the cavity may be designed in the shape of a spiral, located so that impinging off-axis radiation is continually reflected inward and thus absorbed. Likewise, any embodiment of the subject optical shield may be utilized in combination with an optical system which also employs a conventional tube-baffle shield situated in front of the primary optical apparatus.

The instant invention has been shown by tests to be many times more effective than the conventional "tube-baffle shield" devices. While its optimum configuration is dictated by the geometry of the optical system, the overall length (the troublesome dimension) is dependent primarily upon the focal length of the system, and not on a need for increased internal structure. Since the shield operates behind the focal plane, it is occupying space which would ordinarily be empty, rather than increasing the total spacial requirements as is done by devices placed in the object plane. The shield serves not only as an effective trap for externally impinging off-axis radiation, but also causes internal cavity self-emission to undergo a great number of reflections before escaping to affect the receiver.

Another advantage of the invention is that it can be utilized in a "cascade" fashion with a refocusing optical system accompanying each successive trap. By this means a very high attenuation of stray radiation is obtained with a relatively slight increase in the requirements for system housing.

DESCRIPTION OF THE PREFERRED EMBODIMENT

Figure 1:
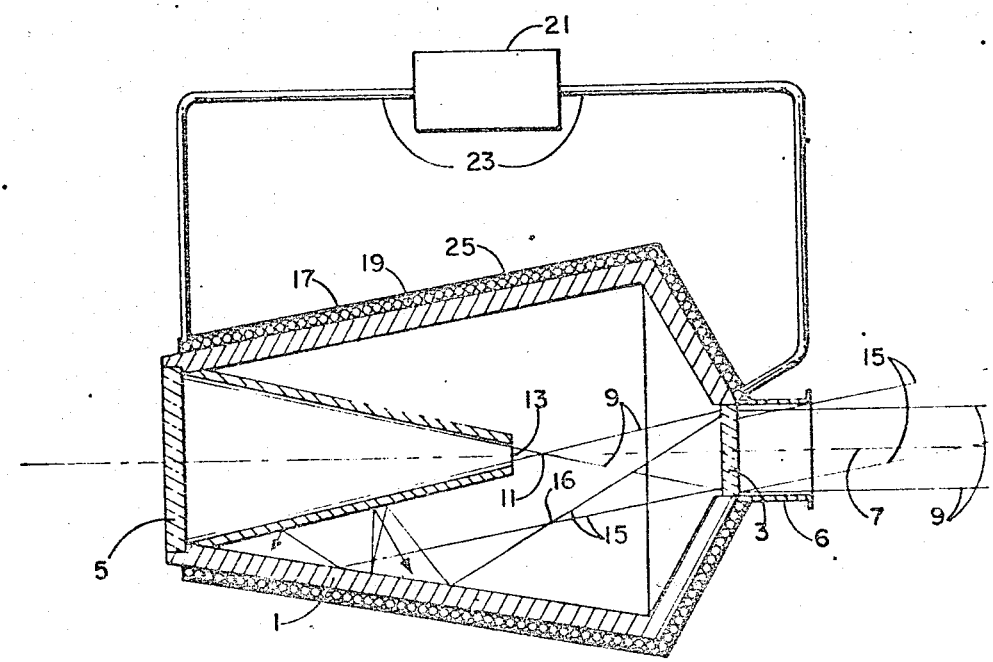
FIG. 1 is a schematic representation outlining the arrangement of major optical system elements with which the preferred embodiment of my optical shield typically cooperates.

Referring to FIG. 1, the instant optical shield 1 is shown in a typical location between a primary optical apparatus 3 and an electro-optical detector 5. A conventional cylindrical tube-type shield 6 is also shown located in front of primary optical apparatus 3. Primary optical apparatus 3 may comprise a lens or any other suitable means for focusing incident energy to a focal point and directing it onto a detector, and electro-optical detector 5 may comprise any suitable means for transducing incident radiant energy into electrical energy. The system has a primary optical axis 7 and detects "target" radiation from sources located substantially on the axis. Target radiation, represented by lines 9, is focused by primary optical apparatus 3 at a point 11 in an image plane and on primary optical axis 7, near a relatively restricted aperture 13. The design of the shield is such that the thereafter diverging radiation passes through aperture 13 free from interference, so as to be received by detector 5.

Lines 15 represent radiation from a nontarget source off the primary optical axis. Since the radiation emanates from a source which does not lie on primary optical axis 7, it is not focused at 11 to pass through aperture 13, but at some other point 16 in the image plane and is directed elsewhere within shield 1 and absorbed.

Shield 1 is surrounded by cooling coils 17 which contain a suitable refrigerant 19 supplied by a source 21 and ducts 23. Coils 17 are surrounded by an outer wall and insulating layer 25.

Figure 2:
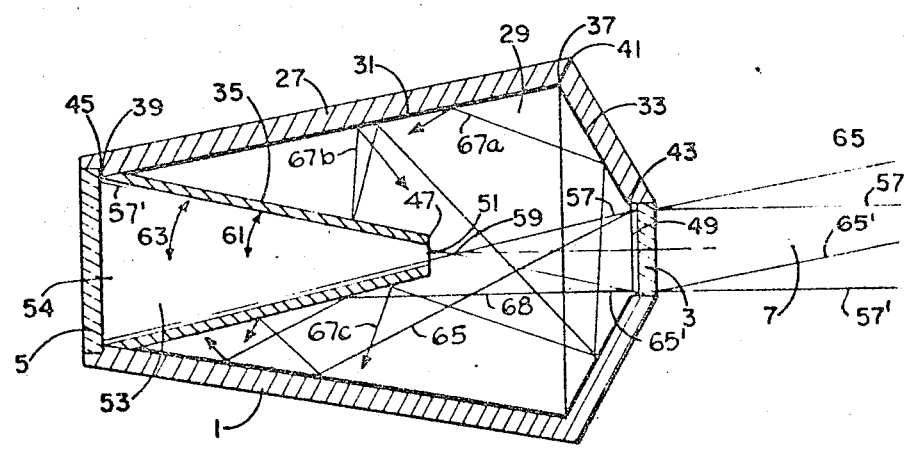
FIG. 2 is a longitudinal cross-sectional view of a preferred embodiment of the optical shield utilized by my invention.

Referring to FIG. 2, shield 1 is shown symmetrical about primary optical axis 7 between primary optical apparatus 3 and electro-optical detector 5. Shield 1 comprises a housing 27 in which is located a first chamber 29 defined by three walls 31, 33, and 35, each of which in the preferred embodiment may be a surface of revolution about primary optical axis 7. Housing 27 may extend as shown, to encase primary optical apparatus 3 and electro-optical detector 5. Wall 31 is generally in the shape of a relatively narrow-based truncated conical surface, with its surface converging toward axis 7 from right to left, the right end in FIG. 1 being the end at which light enters chamber 29. Wall 31 has a major base 37 (the larger) and a minor base 39 (the smaller). Wall 33 may be a relatively broad-based truncated conical surface having a major base 41 and a minor base 43. Major base 41 of wall 33 and major base 37 of wall 31 are joined circumferentially, so that minor base 43 projects out of chamber 29. Wall 35 may also be a truncated conical surface, with a major base 45 and a minor base 47, major base 45 being joined circumferentially with minor base 39 of wall 31, so that minor base 47 projects into chamber 29. Chamber 29 communicates with primary optical apparatus 3 through an aperture 49 defined by minor base 43 of wall 33. A second aperture 51, defined by minor base 47 of wall 35, connects chamber 29 to a second chamber or cavity 53 defined by the portion of wall 35 external to chamber 29, cavity 53 communicating with electro-optical detector 5 through an aperture 54 defined by major base 45. The inner walls of housing 27 are coated with a material 55, such as platinum black or gold black, which is capable of absorbing a large portion of the radiation incident upon it.

In FIG. 2 lines, 57', represent a beam of target radiation from a source located substantially on the primary optical axis, which is focused by optical apparatus 3 to a focal point 59. It can be seen that the design of the optical system is such that the target radiation does not thereafter come in contact with the shield. The shield is designed so that aperture 51 is generally located near focal point 59 of the primary optical apparatus and is only as large as necessary to pass the focused target radiation without interference. Wall 35 may be constructed so that cavity 53 forms a solid angle 61 from primary optical axis 7 which is equal to or slightly larger than the corresponding angle 63 of the emerging beam of target radiation. Front aperture 49 has a diameter equal to or slightly larger than the beam of converging focused radiation at its location.

Lines, 65', represent off-axis radiation. Since this radiation is focused so as not to converge on aperture 51 but at some point 68, it will strike some portion of wall 33 or 35 and be reflected from wall to wall, a large portion of the radiation being absorbed with each reflection.

Lines 67a, 67b, and 67c represents self emission from the walls of chamber 29. This type of stray radiation is not of major concern in connection with the instant shield, as the surface which can give rise to reradiation is cooled and is of considerably less area than in most earlier "tube-baffle shield" systems. In addition, the major portion of any internal radiation will be repeatedly reflected as shown by line 67, so as to avoid escape through aperture 51.

Figure 3:
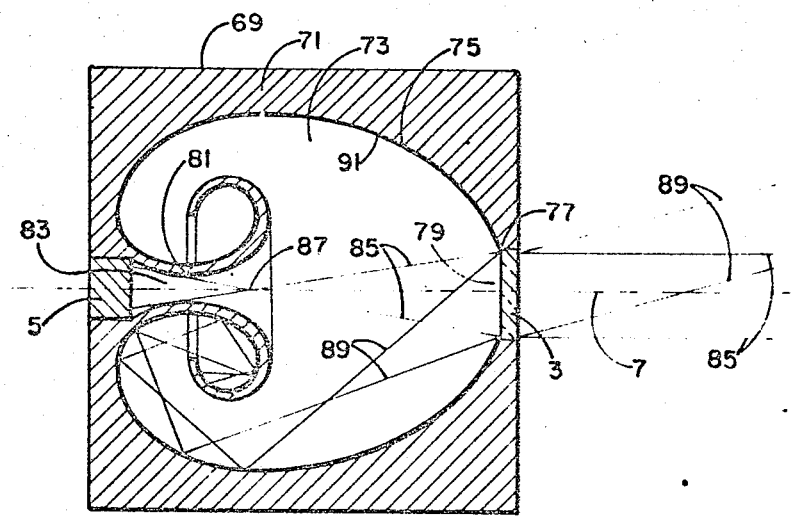
FIG. 3 is a longitudinal cross-sectional view of an alternate embodiment of an optical shield.

FIG. 3 shows an alternate embodiment of an optical shield 69 aligned with primary optical axis 7. Optical shield 69 is located between primary optical apparatus 3 and electro-optical detector 5. It comprises a housing 71 in which is located a chamber 73 defined by a wall 75 which may be a surface of revolution about primary optical axis 7. Housing 71 may extend, as shown, to encase primary optical apparatus 3 and electro-optical detector 5. Longitudinally wall 75 may be in the shape of a spiral of proper curvature and orientation to primary optical axis 7, such that in revolution about primary optical axis 7 an outermost point 77 defines an aperture 79 sufficient to accommodate radiation converging from primary optical apparatus 3. The portion 81 of the spiral nearest axis 7 in revolution defines an aperture 83 which is of sufficient diameter to accommodate a diverging beam of focused radiation and electro-optical detector 5. Lines 85 represent a focused beam of target radiation from a source on the primary optical axis, impinging to a focal point 87. Due to the design of the shield, the target radiation passes through aperture 83 free from interference and onto electro-optical detector 5. Lines 89 represent off-axis radiation. This radiation is not directed to a focal point on primary optical axis 7, but strikes wall 75 near its spiral portion, so as to be reflected into the interior of the spiral. The curvature of the spiral is such that the beam of radiation is repeatedly reflected inward with a large portion absorbed on each reflection. The walls of chamber 73 may be partially or totally coated with a light-absorbing material 91.

Figure 4:
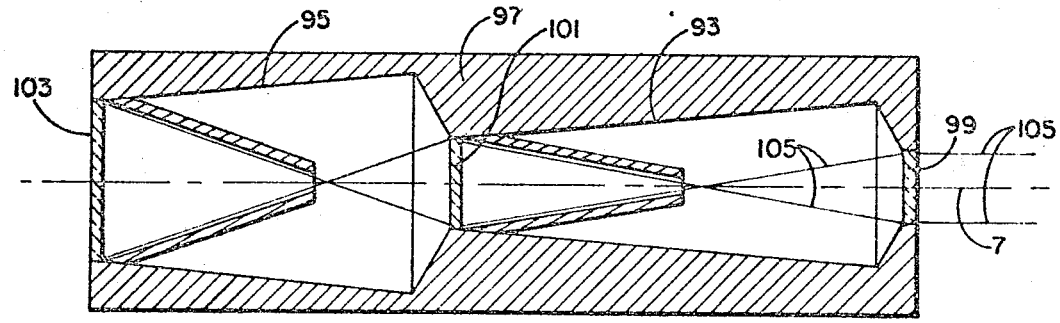
FIG. 4 shows a cascade arrangement of two optical shields utilized by my invention.

FIG. 4 shows two optical shields 93 and 95 cascaded in a housing 97 so as to receive the focused radiation from a source aligned with primary optical axis 7. Shield 93 has a primary optical system 99 and shield 95 a primary optical system 101. An electro-optical detector 103 is also shown. Both shields, the optical systems and the detector, are axially aligned along primary optical axis 7.

Target radiation, represented by lines 105, is focused by primary optical system 99 through shield 93, in the fashion described above, so as to impinge on primary optical system 101. The radiation is again focused by primary optical system 101 through shield 95 and onto electro-optical detector 103.

Although only two optical shields are shown in FIG. 3, any reasonable number may be arranged in cascade fashion.

It is evident that various modifications may be made to the apparatus disclosed herein without departing from the spirit and scope of the invention, such as modifying the basic shape of the "deeper" portion of the optical shield in which the majority of the stray radiation is absorbed. Furthermore, the optical shield need not be restricted to use with an electro-optical detector, but may be utilized to shield any appropriate optical receiver from off-axis radiation. Consequently I do not intend the present invention to be limited to the particular embodiments or apparatus shown, except as defined by the appended claims.

I claim as my invention:

1. Apparatus of the class described comprising in combination:

an elongated radiant energy absorbing chamber having first and second apertures longitudinally spaced along an axis thereof;

primary optical apparatus mounted in said first aperture for converging radiant energy from a remote object at a point in an image plane located within said chamber between said apertures, said energy thereafter diverging at a predetermined angle toward said second aperture;

optical detecting means mounted beyond said second aperture to receive energy diverging therethrough, the angle subtended by said detecting means and that subtended by said second aperture, at said point, being substantially equal to said predetermined angle; and radiant energy absorbing means reentrant within said chamber, and surrounding said second aperture, for cooperating with said chamber to minimize the passage of energy not originating at said object to said detector.

2. Apparatus according to claim 1 in which the last named means includes an opaque, conical, radiant energy absorbing wall, reentrant within said chamber and containing said second aperture at the vertex thereof, for cooperating with said chamber to minimize the passage of energy not originating at said object to said detector.

3. Apparatus according to claim 1 in which the last named means includes a mounting having a surface described by rotating a portion of a spiral about an axis of revolution lying in the plane of the spiral and displaced from the pole thereof, said axis of rotation coinciding with the axis of said chamber.

4. Apparatus according to claim 2 in which said chamber includes a conical wall tapering oppositely to the reentrant end wall to define therebetween and annular space which tapers away from said primary optical apparatus.

* * * * *